Sept. 26, 1961    F. G. PAXTON    3,001,570
GLUING MACHINE
Filed July 2, 1959    8 Sheets-Sheet 1

INVENTOR.
FLOYD G. PAXTON
BY
ATTORNEY.

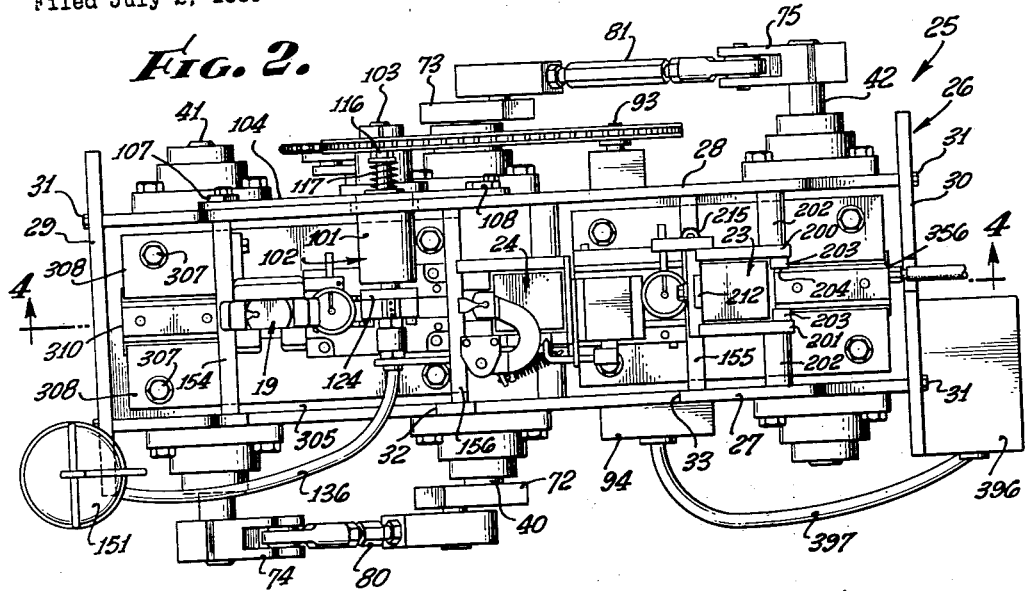
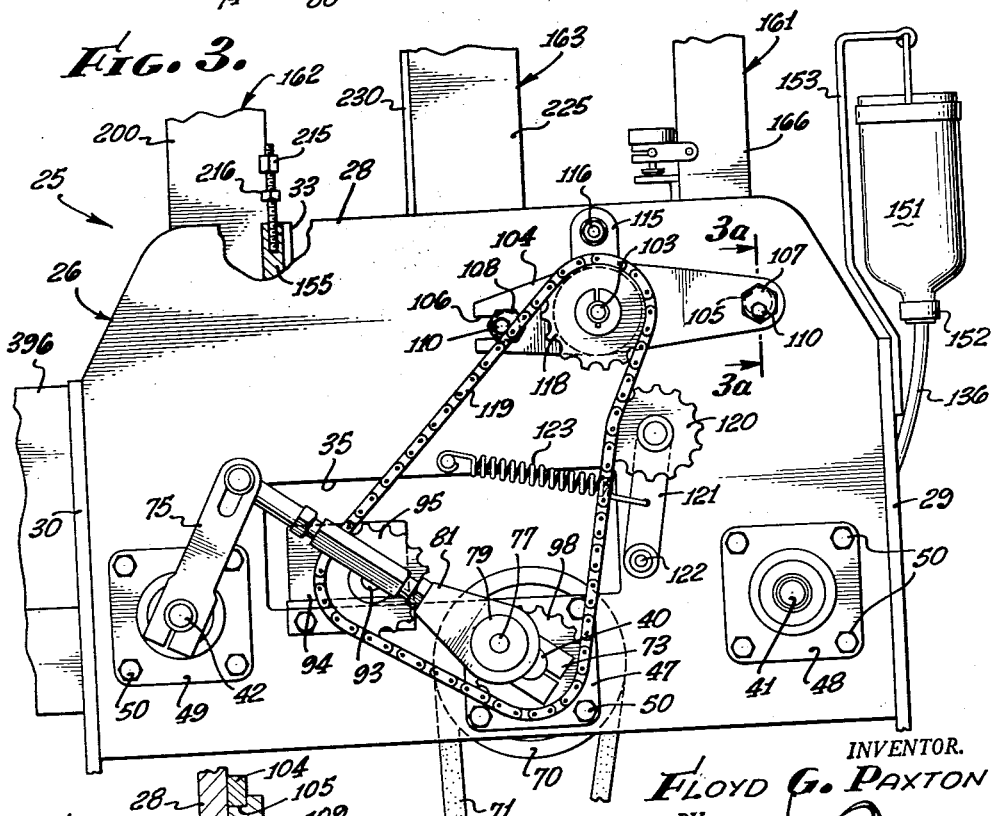

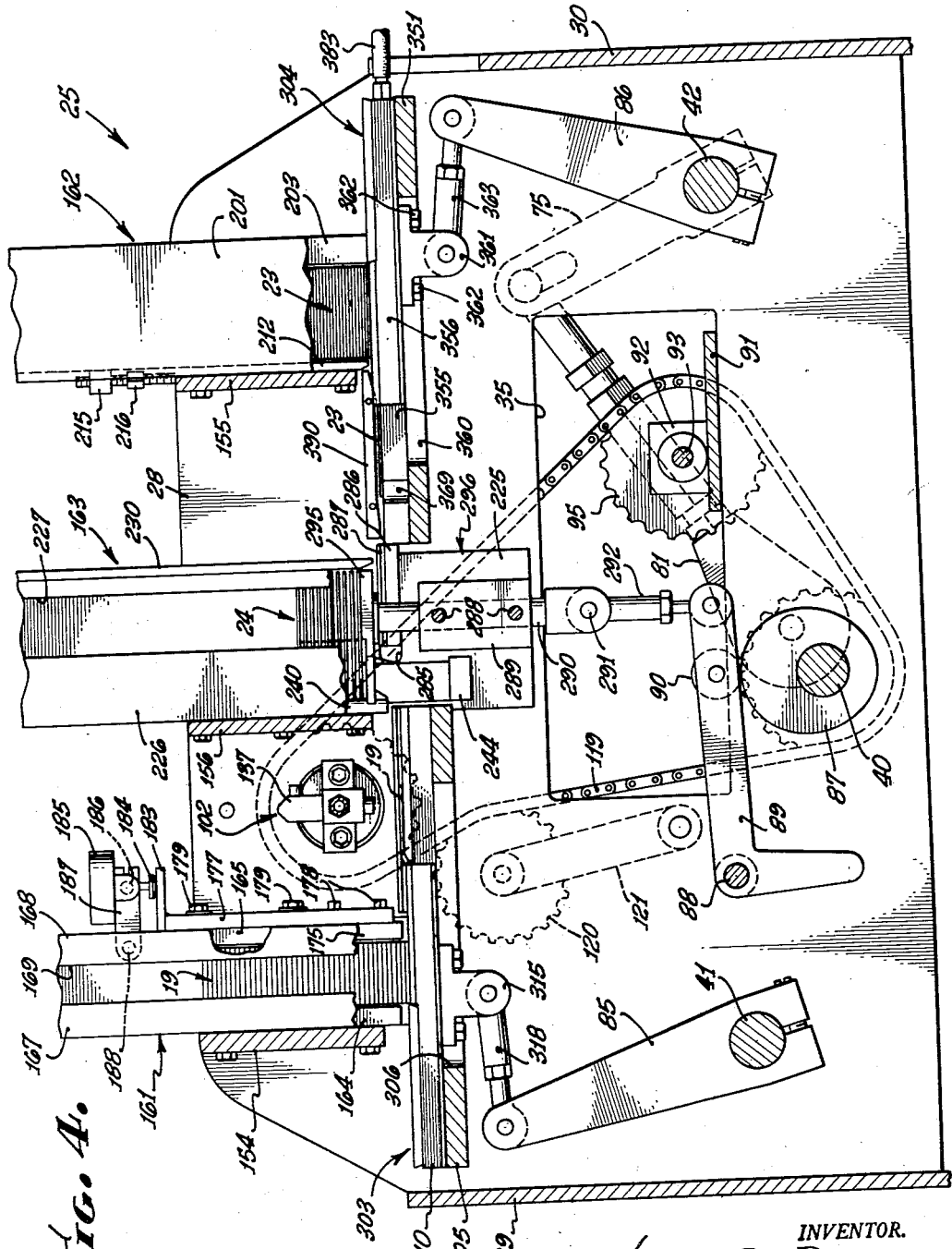

Sept. 26, 1961  F. G. PAXTON  3,001,570
GLUING MACHINE
Filed July 2, 1959  8 Sheets-Sheet 4

INVENTOR.
Floyd G. Paxton
BY

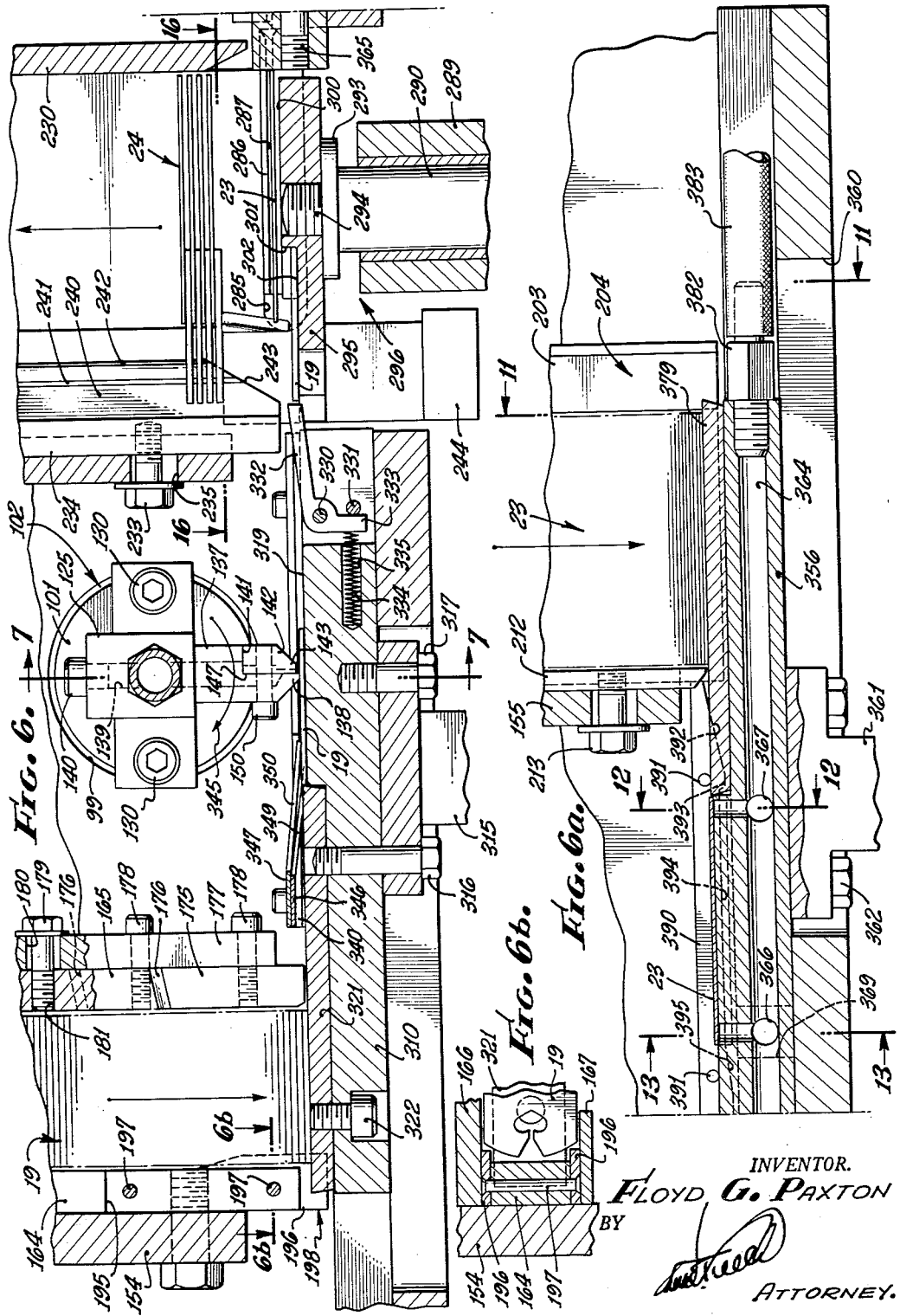

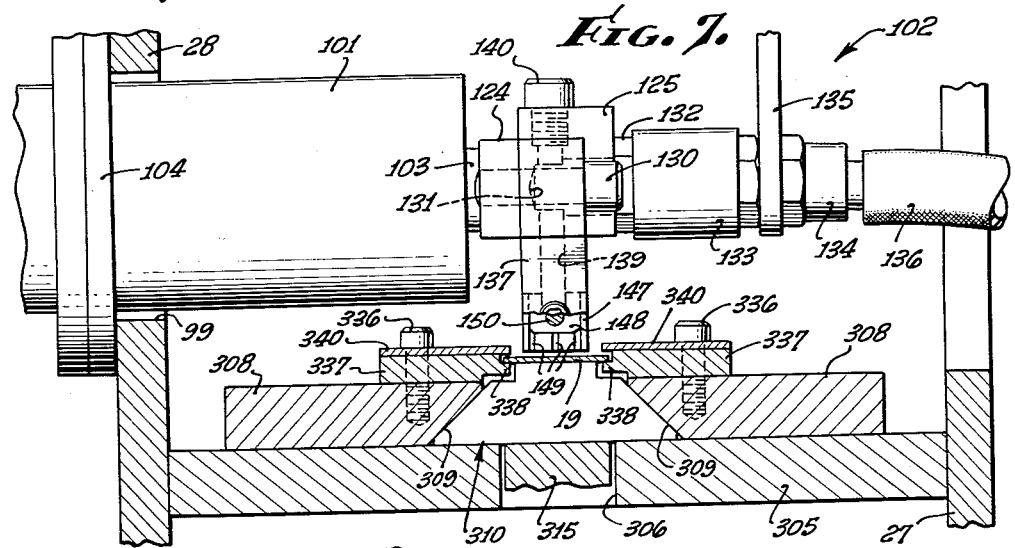
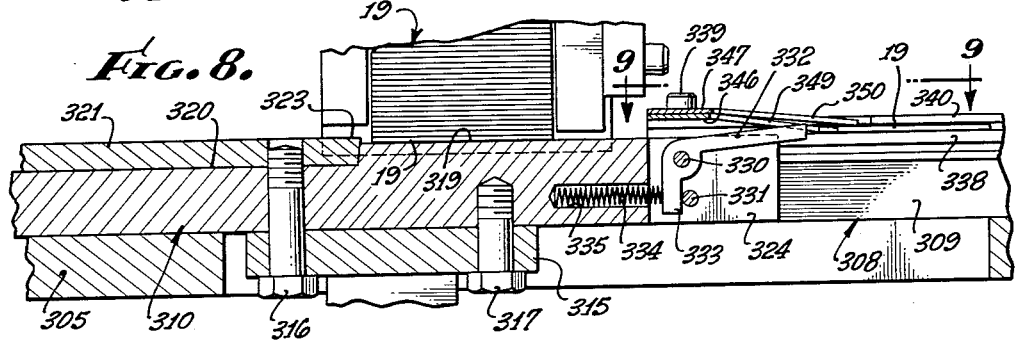
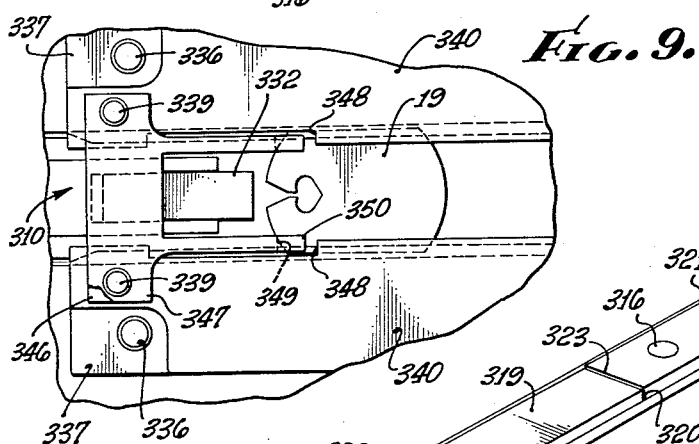
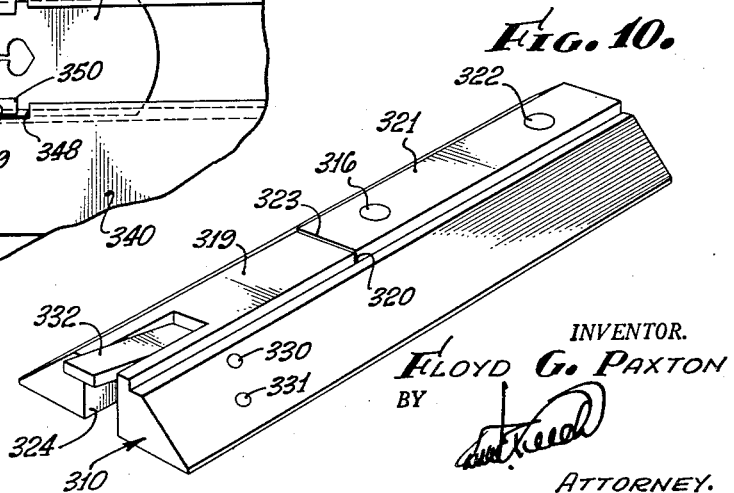

Sept. 26, 1961  F. G. PAXTON  3,001,570
GLUING MACHINE
Filed July 2, 1959  8 Sheets-Sheet 7
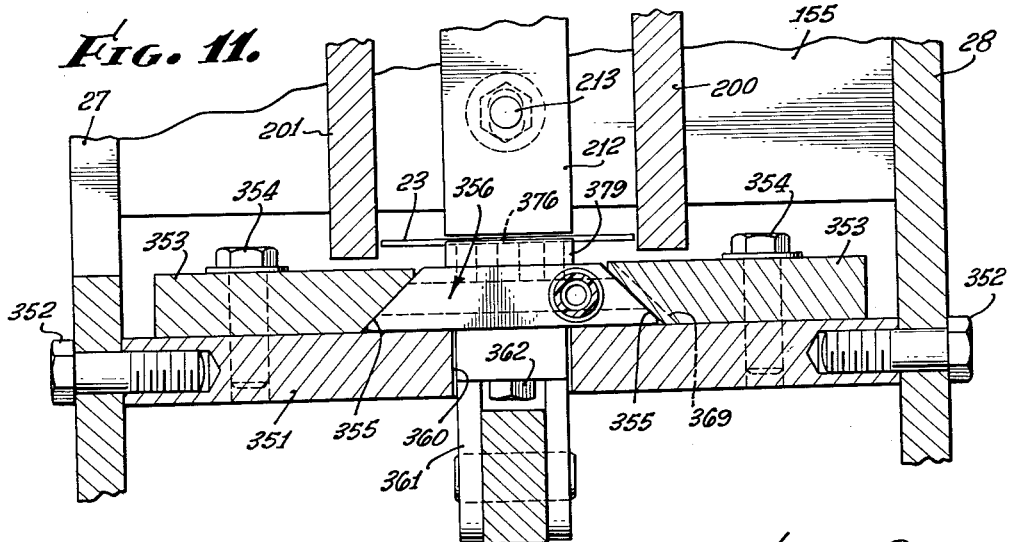
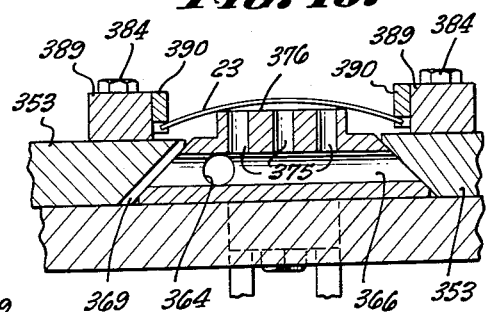
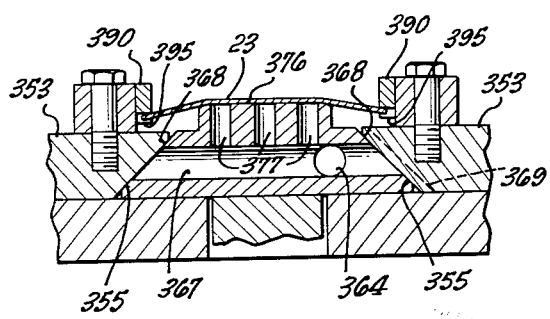
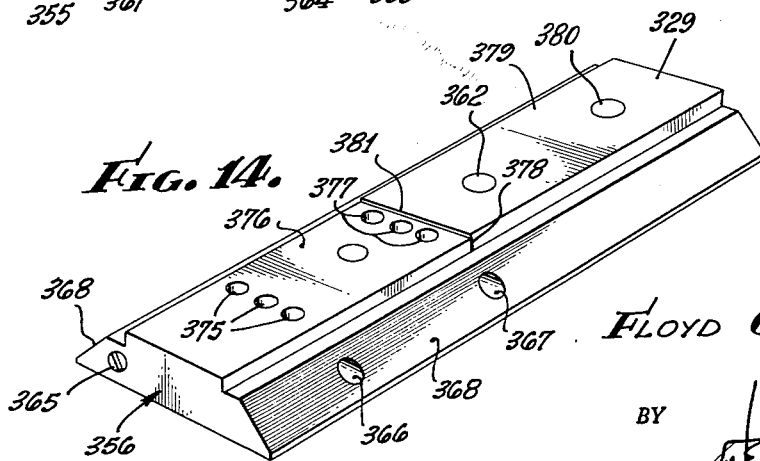
FLOYD G. PAXTON
INVENTOR.
BY
ATTORNEY.

Sept. 26, 1961 F. G. PAXTON 3,001,570
GLUING MACHINE
Filed July 2, 1959 8 Sheets-Sheet 8

Floyd G. Paxton
INVENTOR.

BY

ATTORNEY.

United States Patent Office 3,001,570
Patented Sept. 26, 1961

3,001,570
GLUING MACHINE
Floyd G. Paxton, P.O. Box 2098, Yakima, Wash.
Filed July 2, 1959, Ser. No. 824,677
17 Claims. (Cl. 156—378)

This invention relates to the art of gluing together small elements as a method of manufacturing assembly.

It is an object of the present invention to provide a machine having a high capacity in the production of articles by this method.

Another object of the invention is to provide a gluing machine for gluing together small elements of sheet material in a precise overlapping relation.

A further object is to provide such a machine which is simple in construction and in operation and may be attended by a single operator.

Yet another object is to provide such a machine which will automatically mark the product at fixed intervals in the production thereof to facilitate division of the product into lots containing a fixed number of units or a desired multiple thereof.

It is another object to provide in such a machine, a precise mechanism for accurately separating one element of sheet material from a stack of such elements in each of a rapid sequence of element feeding operations.

Still another object is to provide a gluing machine in which quantities of individual elements of sheet material are stored in separate hoppers, said machine feeding an individual element from each hopper to position elements, so fed, in a particular overlapping relation, applying glue to one of said elements incidental to said feeding operation, and then delivering said elements, so fed, and so related, into a gluing hopper for receiving the same whereby each such group of related elements will be pressed together upon the glue so applied to one of said elements, the elements of said group thus being glued together as a single production unit, and said units stacked together in said gluing hopper.

It is also an object of the invention to provide such a machine for uniting bag closure devices made of sheet material with cards comprising labels for the goods contained in the bag.

One such closure device in common use for the purpose of trying the neck of a flexible bag to contain a product in said bag is known as the "Kwik Lok" and comprises a small tag of relatively stiff but flexible sheet plastic material which has an opening formed therein with a restricted mouth, by means of which said bag neck locking operation is performed.

A yet further object of the invention is the provision of such a gluing machine by which bag closures such as "Kwik Loks" may be economically united with label cards.

It is also an object of the invention to provide such a machine in which the openings provided in said "Kwik Loks" are utilized for precisely relating said "Kwik Loks" with said label cards in the gluing operation.

The manner of accomplishing the above objects as well as further objects and advantages will be made manifest in the following description taken in connection with the accompanying drawings in which FIG. 1 is a fragmentary front elevational view of a preferred embodiment of the invention.

FIG. 2 is a plan view of FIG. 1.

FIG. 3 is a fragmentary rear elevational view of the invention.

FIG. 3a is a detail sectional view of one of the eccentric adjusting devices of the bearing mount of the gluer shaft of the invention, and is taken on line 3a—3a of FIG. 3.

FIG. 4 is an enlarged vertical sectional view taken on the line 4—4 of FIG. 2 and showing the parts of the machine with bag closure and card picks in their extreme separated or starting positions.

Figure 5:
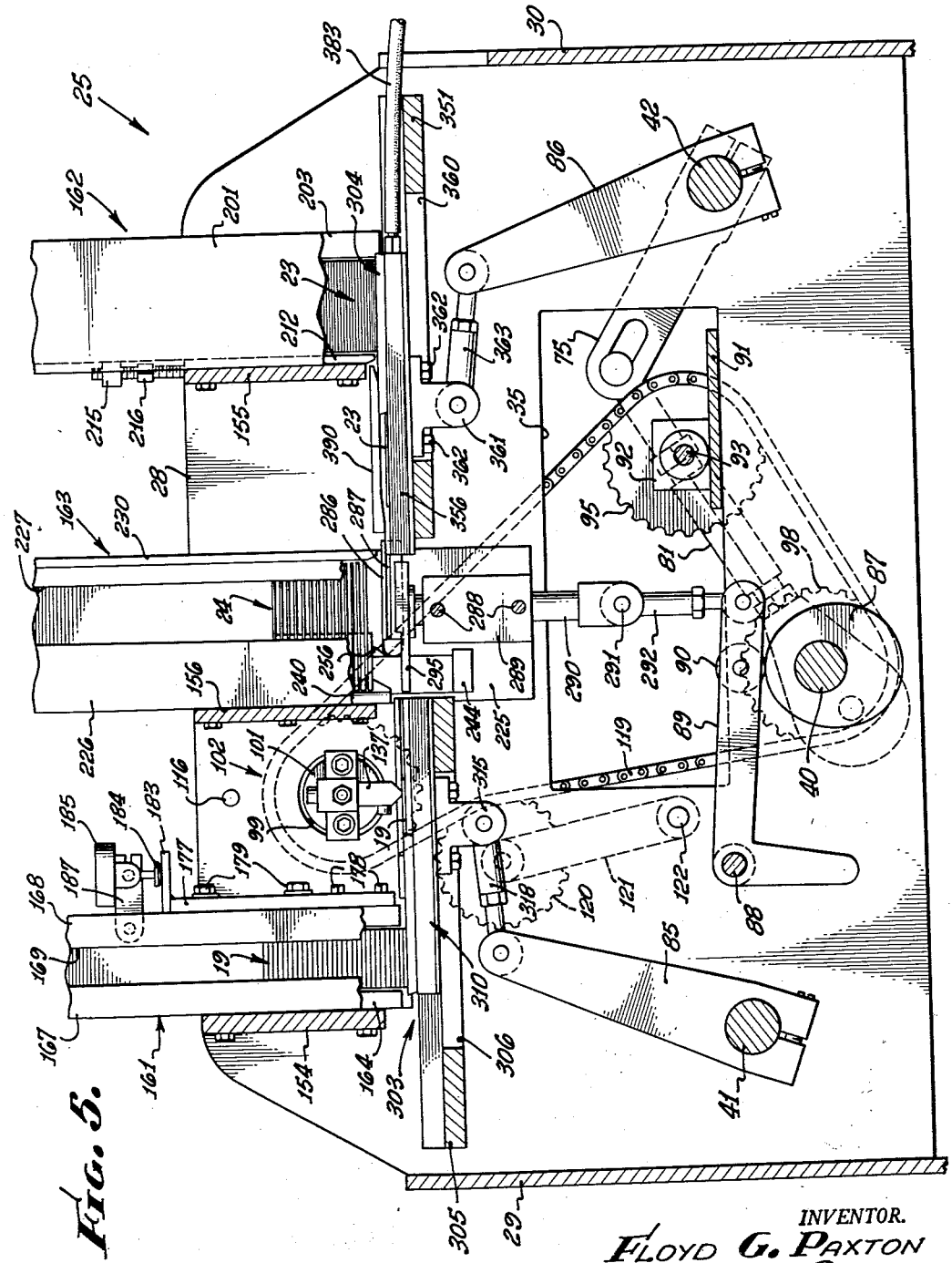
FIG. 5 is a view similar to FIG. 4 and illustrates the parts of the machine positioned at the midpoint in an operating cycle at which the bag closure tag and card picking devices are in their positions of closest approach and in which the gluing device is applying glue to a bag closure.

FIGS. 6 and 6a comprise an enlarged composite vertical sectional view also taken on the line 4—4 of FIG. 2 with the parts of the machine positioned as shown in FIG. 5 and showing the pick carriers and picks in section.

FIG. 6b is a detail sectional view taken on line 6b—6b in FIG. 6 and shows how the back check means on the bag closure hopper prevents reverse feeding of bag closures from said hopper.

FIG. 7 is an enlarged fragmentary cross-sectional view taken on the line 7—7 of FIG. 6 and illustrates the operation of the gluing device applying glue to a bag closure.

FIG. 8 is an enlarged fragmentary vertical sectional view of the bag closure pick and the closure advancing dog on the closure pick carrier and with said carrier in retracted position relative to the bag closure hopper.

FIG. 9 is a fragmentary plan view of FIG. 8.

FIG. 10 is a perspective view of the bag closure pick carrier.

FIG. 11 is a fragmentary cross-sectional view taken on the line 11—11 of FIG. 6a and illustrates the manner in which the cards are supported on the upper surface of the card pick carrier and retained from lateral escape by the side walls of the card hopper.

FIG. 12 is a fragmentary cross-sectional view through the card pick carrier on line 12—12 of FIG. 6a and illustrates the manner in which the card being propelled from the bottom of the card hopper by the card pick is held snugly downwards against the card pick carrier by vacuum until the card pick carrier completes its feeding movement.

FIG. 13 is a fragmentary vertical sectional view taken on the line 13—13 of FIG. 6a and illustrates the manner in which vacuum for holding a card downwardly against the card pick carrier is relaxed as the latter completes its feeding movement, thereby releasing said card from said vacuum, and permitting said card pick carrier to be withdrawn from beneath said card in the return movement of said carrier to its starting position.

FIG. 14 is a perspective view of the card pick carrier and the hopper bottom and card pick provided thereon.

Figure 1:
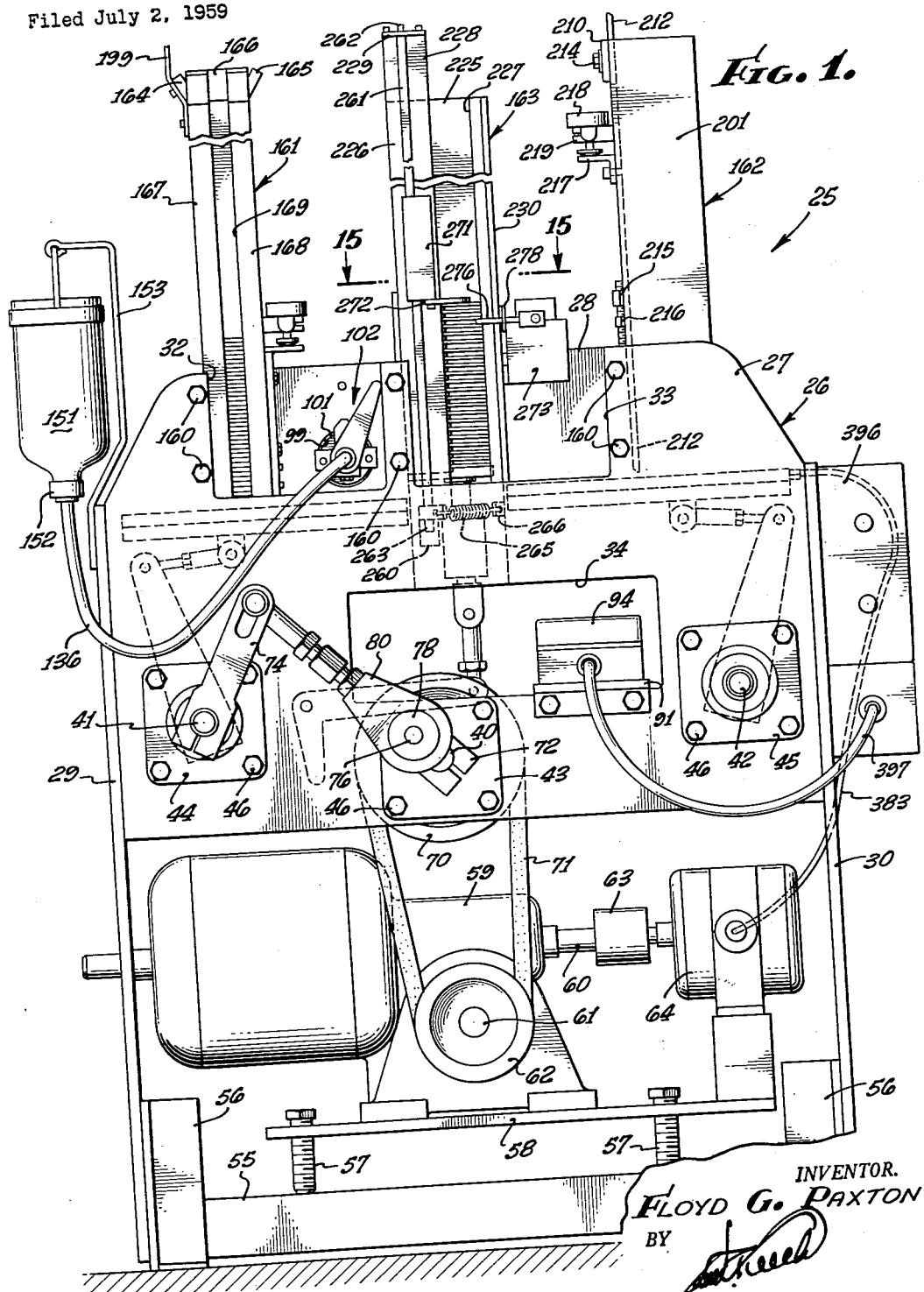
Figure 15:
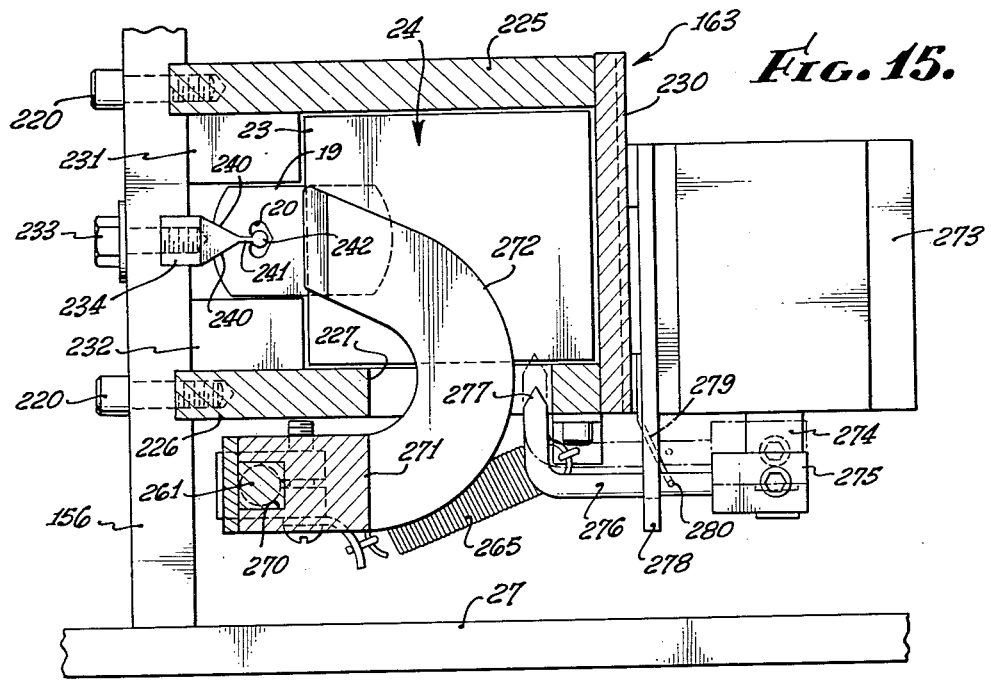

FIG. 15 is an enlarged horizontal fragmentary sectional view taken on the line 15—15 in FIG. 1 and illustrates the weighted arm for holding down the stack of assembled units in the assembly hopper of the machine together with the means for marking the units stacked in said hopper at fixed intervals in the production of said units so that a given number of units are disposed between successive markings so applied.

Figure 16:
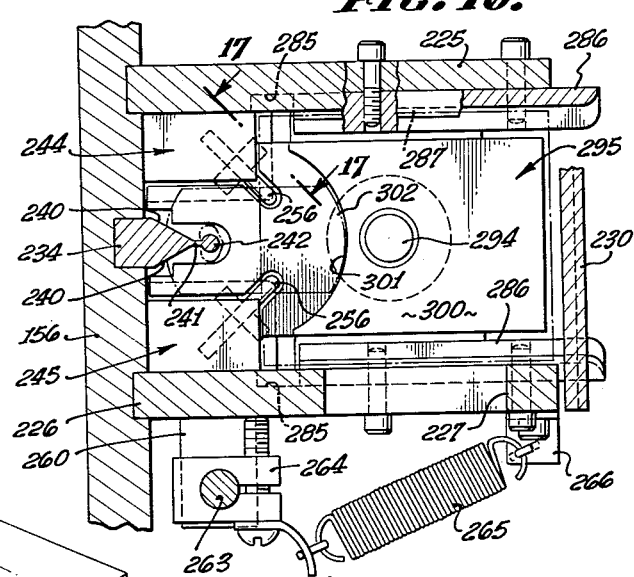

FIG. 16 is a fragmentary horizontal sectional view taken on the line 16—16 of FIG. 6 and illustrates the bag closure aligning means provided in the unit assembly hopper and the stack supporting dogs which yield to receive each assembled unit delivered to said hopper and then return into supporting position under said stack, including the units so added thereto.

Figure 17:
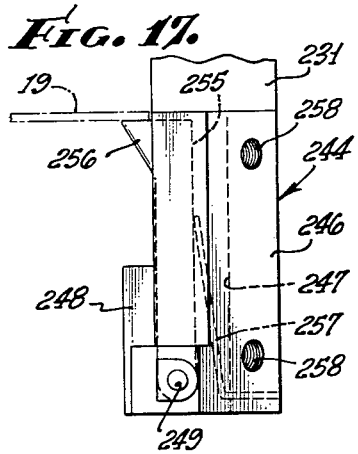

FIG. 17 is a fragmentary elevational view of one of the stack supporting dogs and the mount therefor, and is taken on the line 17—17 of FIG. 16.

Figure 18:
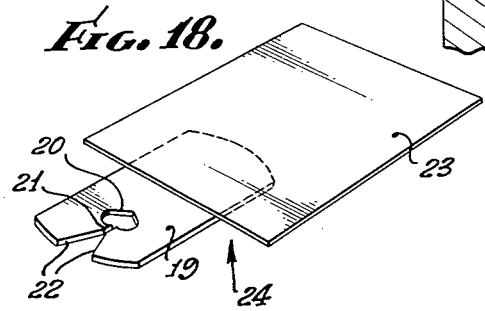

FIG. 18 is a perspective view of one of the units assembled by said machine, this unit comprising a Kwik Lok bag closure and a label card glued thereto.

Before proceeding with a detailed description of the invention, attention is directed to the Kwik Lok bag closure 19 shown in FIG. 18 as having a heart-shaped opening 20 which connects with a curved end edge of the closure through a narrow slot 21 which terminates outwardly in a widely flaring mouth 22. The closure 19 is here shown as glued to a rectangular label card 23 to form an assembled bag closure-label 24, such as the present invention is particularly designed to manufacture.

Referring specifically to the other views in the drawings, the invention is there shown as embodied in a gluing machine 25 having a frame 26 formed mainly of flat plates of steel secured together by cap screws and bolts. Frame 26 thus includes parallel vertical plates 27 and 28 disposed at the front and rear of the machine and which are connected together by left and right end plates 29 and 30 which are secured by cap screws 31 to plates 27 and 28. As seen by comparison of FIGS. 1 and 3, the vertical front and rear frame plates 27 and 28 are substantially alike in outline excepting for the provision of deep openings 32 and 33 in the upper edge of plate 27. These plates are provided respectively with like, large rectangular holes 34 and 35 which are horizontally aligned. These plates are also provided with aligned apertures for receiving shafts 40, 41 and 42, for journaling which, self-aligning ball bearings 43, 44 and 45 are secured to the front face of vertical front frame plate 27 by bolts 46, and corresponding bearings 47, 48 and 49 are secured to the back face of the rear transverse vertical frame plate 28 by bolts 50.

The frame 26 also includes a horizontal floor plate 55 which is secured to end plates 29 and 30 at its corners by angle brackets 56. Supported on the floor plate 55 by adjusting screws 57 is a motor mounting plate 58. Bolted to and supported by plate 58 is a geared motor 59 having a direct drive shaft 60 and a reduction gear drive shaft 61 carrying a drive pulley 62. Also mounted on the plate 58 in coaxial alignment with direct drive shaft 60 and connected thereto by a coupling 63 is a vacuum pump 64.

The shaft 40 has fixed thereon a driven pulley 70 which is in radial alignment with drive pulley 62 and is connected thereto by an endless V-belt 71. Fixed on the front and rear ends of shaft 40 are pick operating cranks 72 and 73. Fixed on the front end of shaft 41 is a rocker arm 74 and fixed on the rear end of shaft 42 is a rocker arm 75. The extremities of cranks 72 and 73 are provided with crank pins 76 and 77 respectively which journal in ball bearings 78 and 79 provided in adjacent ends of adjustable connecting rods 80 and 81, the opposite ends of which pivotally connect to the outer ends of rocker arms 74 and 75 respectively. Thus, rotation of shaft 40 by motor 59 causes shafts 41 and 42 to be repeatedly rocked in opposite directions through angles of approximately 35°. Said shafts are shown rocked to the outermost extremity of this movement in FIGS. 1, 2, 3 and 4 and to its innermost extremity in FIG. 5.

Fixed on shafts 41 and 42 between vertical transverse frame plates 27 and 28 are pick operating arms 85 and 86. Fixed on the shaft 40 between said frame plates is an elevator operating cam 87. Secured in suitable aligned apertures provided in frame plates 27 and 28 is a shaft 88 upon which is pivotally mounted an elevator lever 89 having a cam following roller 90 which rides on cam 87.

Resting at its opposite ends on the lower edges of holes 34 and 35 in frame plates 27 and 28 and rigidly secured thereto is a switch mounting plate 91 having a bearing 92 fixed thereon in which a shaft 93 journals. Also mounted on plate 91 and connected with shaft 93 to be driven thereby is a reduction geared rotary limit switch 94. Fixed on the rearwardly extending end of shaft 93 is a sprocket 95. Fixed on the rear end portion of shaft 40 between bearing 47 and crank 73 is a sprocket 98 having the same number of teeth as and being radially aligned with the sprocket 95.

Mounted on the back frame plate 28 so as to extend loosely through a suitable hole 99 provided therein is the double ball bearing unit 101 of a glue applicator 102. Journaled in the bearing unit 101 is a glue applicator shaft 103.

The bearing unit 101 is provided with a mounting plate 104 which lies flat against the back surface of the frame wall 28. This plate has a round hole 105 at one end thereof (FIG. 3a) and a slot 106 at the opposite end thereof (FIG. 3), said slot being the same width as the diameter of said hole, and both slot and hole being formed symmetrically with a horizontal plane located below the axis of the shaft 103. Fitting into the hole 105 and slot 106 are like circular hex headed bushings 107 and 108, each of these bushings having an eccentric hole 109 provided therein for receiving a cap screw 110 which screws into one of a pair of suitable tapped apertures 111 provided in frame plate 28 to hold the bushings 107 and 108 in any selected positions respectively in the hole 105 and slot 106 of the plate 104. As will be seen in FIG. 3, the tapped aperture 111 for receiving the screw 110 in bushing 107 is located directly below the axis of the hole 105 in plate 104 so that glue applicator 102 may be adjusted horizontally by loosening said screw 110, slightly rotating the busing 107 and then resetting said screw. It is also to be noted that the hole 111 for receiving the bolt 110 which extends eccentrically through the bushing 108 is located in the horizontal plane on which the hole 105 and slot 106 are centered, so that any rotation of the bushing 108 while its screw 110 is temporarily loosened, effects a vertical adjustment of the glue applicator 102.

Plate 104 has an upwardly extending lug 115 which is apertured to loosely receive a screw 116, the latter then being screwed into a suitable tapped hole provided therefor in vertical frame plate 28. Coiled about screw 116 between the head of said screw and lug 115 is an expansion spring 117 which yieldably holds the lug 115 against the back face of plate 28 but is adapted to yield to a substantial upward pressure on the inner end of glue applicator shaft 103, the purpose of this being made clear hereinafter. Mounted on the rear end of shaft 103 is a chain sprocket 118 which has the same number of teeth as and is in radial alignment with the sprockets 95 and 98 and is connected to these by a link chain 119. This chain is held taut by an idler sprocket 120 mounted on an arm 121 pivoted at 122 on the frame plate 28 and held under tension against the chain 119 by a contractile spring 123.

It may be here noted that as the sprockets 95, 98 and 118 have an equal number of sprocket teeth, and as these sprockets are connected together by endless chain 119, the rotation imparted from motor 59 to shaft 40 is transmitted to shaft 93 and 103 so that these rotate in the same direction and at the same speed as shaft 40.

Welded on the front end of shaft 103 is a T-head 124 to which a glue applicator head 125 is secured by Allen screws 130. This head has an axial bore 131 which is tapped for receiving a nipple 132 which connects through a fluidtight swivel fitting 133 with a hose nipple 134 which has a torque arm 135 to prevent rotation of said nipple and which connects with a glue hose 136.

The glue applicator head 125 has a gluing arm 137 extending radially therefrom and terminating in a chisel-like nose 138 (FIG. 6). A liquid glue conducting bore 139 is formed in the glue applicator head 125, this bore being closed at one end by a screw plug 140, then opening into the central bore 131 of said head and then continuing from the latter along the axis of arm 137 and terminating near the nose 138 at the tip of said arm. The arm 137 has a notch 141 cut away from one side of the end portion thereof to provide ground faces against which an insert 142 fits with liquidtight sealing engagement so as to practically take the place of the material removed to form notch 141, with this exception that the tip 143 of insert 142 is a fraction of an inch shorter than the nose 138 of the arm 137 (see FIG. 6). One of the planes of engagement between the ground surfaces of the notch 141 in arm 137, and the insert 142, lies in a plane containing the rotational axis of the applicator head 125 as well as the radial axis of the arm 137. The insert 142 has a ground face 147 which lies in said plane of engagement, said face having a shallow manifold recess 148 formed therein which communicates freely with bore 139. Three shallow channels 149 are also formed in said face which communicate radially between the manifold recess 148 and the tip 143 of insert 142. The insert 142 is tightly held in liquidtight relation with the notch 141 by an Allen screw 150 which passes through a suitable aperture in the arm 137 and screws into a tapped hole aligned therewith in the insert 142.

Liquid glue under a low pressure is supplied to the glue hose 136 by a bottle 151 which is suspended, inverted, with the neck of said bottle connected by a screw fitting 152 with the other end of hose 136. The bottle 151 is suspended on an arm 153 which is adjustably secured to the outer face of vertical end frame plate 29 so that the height at which bottle 151 is thus suspended may be varied readily by an adjustment of arm 153.

Disposed vertically between transverse vertical frame plates 27 and 28 and perpendicular to the latter are hopper supporting plates 154, 155 and 156. These plates are secured to frame plates 27 and 28 by cap screws 160 and are employed as mounting plates for a bag closure hopper 161, a card hopper 162 and an assembled unit stack receiving hopper 163.

The closure hopper 161 includes a left end wall 164 which is bolted to plate 154, a right end wall 165 which is held in spaced relation with wall 164 by a back wall 166 which overlaps and is screwed to walls 164 and 165. Front panels 167 and 168 are secured to front edges of end walls 164 and 165 and are separated by a substantial vertical opening 169 which extends the full length of the hopper.

As shown in FIGS. 4 and 6, the right end wall 165 of bag closure hopper 161 has a lower portion 175 thereof separated from the upper portion of this wall by an angled cut 176 which extends obliquely upwardly from front to rear as it extends across said wall and affords ample opportunity for vertical adjustment of the portion 175 relative to the upper portion of wall 165 so that the portion 175 forms a closure hopper gate. Gate 175 is supported by a vertical bar 177 by Allen screws 178 which extend through suitable holes in bar 177 and are received in tapped holes in gate 175. Bar 177 lies against hopper wall 165 and extends upwardly parallel therewith and is adjustably secured to said wall by cap screws 179 which extend through slots 180 in said bar and are received in suitable tapped holes 181 provided in wall 165. Thus by relaxing the cap screws 179, shifting the bar 177 and gate 175 vertically, and resetting the cap screws 179, a gate opening may be provided at the lower end of hopper 161 of a desired vertical dimension which will facilitate the feeding of sheet elements from the lower end of said hopper.

To facilitate the accurate measurement of said gate opening, the upper end of bar 177 has a horizontal arm 183 provided thereon which is engaged by the responsive element 184 of a micrometer 185 having a mounting bar 186 which is clamped in a clamp arm 187, the latter being adjustably secured by a cap screw 188 to the back wall 166 of hopper 161. The manner in which measurement by this micrometer of the closure hopper gate opening is effected will be made clear hereinafter.

Lower portions of front and rear edges of the left end wall 164 of bag closure hopper 161 have recesses 195 (FIGS. 6 and 6b) for receiving back-check plates 196 which are secured to wall 164 by a pair of rivets 197. Back-check plates 196 are provided for the purpose of narrowing the opening 193 extending leftward below the lower end of wall 164 from the bottom of hopper 161, for a purpose to be made clear hereinafter.

Secured to left end wall 164 of hopper 161 and extending upwardly above the flared upper end of said hopper is a rod 199 for supporting the upper end of a metal strap on which a column of Kwik Lok bag closures is assembled for feeding said column downwardly into the hopper 161.

Card hopper 162 includes rear and front walls 200 and 201 which comprise heavy plates, left edges of which are recessed into and secured by cap screws to frame plate 155. Right edges of walls 200 and 201 are rigidly spaced from frame plates 28 and 27 respectively by spacers 202. Secured to inner faces of walls 200 and 201 near their right edges are panels 203 between which an opening 204 is thus provided throughout the height of the hopper 162.

Left edges of walls 200 and 201 at the upper ends of the latter are slightly recessed into a cross bar 210 which is secured by Allen screws 211 to said walls. Recessed into frame plate 155 and cross bar 210 is a card gate bar 212 which forms the left wall of the card hopper 162 and is secured to frame plate 155 and cross bar 210 by cap screws 213 and 214 which extend through elongated slots in said plate and cross bar and are received in suitable tapped holes provided in the gate bar 212. Thus, by relaxing the screws 213 and 214, bar 212 may be shifted vertically and these screws reset to exactly determine a gate opening for delivering cards from the lower end of hopper 162 in a manner to be pointed out hereinafter. To assist in this vertical adjustment of bar 212 an arm 215 is secured thereto which extends rearwardly from the hopper 162 and has threaded connection with a turnbuckle screw 216 which screws downwardly at its lower end into a tapped hole provided in frame plate 155. When the cap screws 213 and 214 are loosened, rotation of the screw 216 will effect a vertical adjustment of the position of the bar 212. Bar 212 also has an angle bracket 217 which is engaged by the responsive element of a micrometer 218 which is mounted on a clamp arm 219 secured to the rear face of hopper rear wall 200.

The assembled unit stacking hopper 163 which is mounted on frame plate 156 includes rear and front walls 225 and 226, the left edges of lower portions of which are recessed into frame plate 156 and secured thereto by suitable cap screws.

Rear and front walls 225 and 226 of hopper 163 are formed of fairly heavy plate, rear wall 225 being solid throughout its length, front wall 226 having an opening 227 which extends from the upper end down to about the level of the lower limit of opening 33 in front frame plate 27. Lower portions of both walls 225 and 226 extend downwardly approximately to the upper edge of the holes 34 and 35 in the frame plates 27 and 28. The portion of wall 226 on the left hand side of opening 227 has an upward extension 228 having a bearing plate 229, the purpose of which will be made clear hereinafter. Hopper 163 also has a right wall 230 which overlaps and is screwed to right edges of rear and front walls 225 and 226. Filler bars 231 and 232 are disposed in the left rear and front corners of the hopper 163, these bars restricting the left end of the hopper 163 so as to retain therein the manufactured units 24 to be stacked in said hopper.

Disposed vertically in the space between filler bars 231 and 232 and recessed into vertical frame plate 156 and secured thereto by cap screws 233 is a bag closure retaining guide 234. The cap screws 233 extend through vertically elongated slots 235 in frame plate 156 so that by loosening these screws the vertical position of guide 234 may be varied within the limits of these slots, after which the screws 233 may be reset.

The guide 234 has sharply converging faces 240 which terminate in a thin web 241 which connects the body of the guide 234 with a bead 242 of circular cross section. The guide 234 has a tapering face 243 at its lower end, the purpose of which will be made clear hereinafter.

The lower ends of filler bars 231 and 232 terminate just above the lower edge of main frame plate 156 (FIGS.

6, 16 and 17) and spring dog devices 244 and 245 fit the lower ends of and form downward extensions of the bars 231 and 232. The devices 244 and 245 are reverse duplicates of each other and therefore a description of one will suffice for both. Each of these devices includes a body 246 comprising a rectangular block of steel of the same horizontal cross section as one of the bars 231 and 232. Formed in a vertical plane at a 45° angle with the inner face of each of the bodies 246 is a kerf 247 the mouth of which is blocked by a lug 248 welded therein. Pivotally mounted in the kerf 247 on a pin 249 is a dog 255 having a head 256 which extends a substantial distance outwardly from the upper end of kerf 247. Extending into a suitable hole in a lower portion of the body 246 is a wire spring 257 which is bent upwardly in the kerf 247 so as to yieldably urge the dog 255 into outward position as shown in FIGS. 6, 16 and 17. The body 246 of each of the devices 243 and 244 has tapped holes 258 through which suitable screws extend to unite the devices to the hopper walls 225 and 226 in a downward extension of the filler bars 231 and 232 respectively.

Secured to the front face of the front hopper wall 226 near the lower end of the latter is a bearing block 260, the bearing aperture of which is vertically aligned with that of the bearing plate 229 at the upper end of wall 226. Mounted on said plate and block is a square shaft 261 having cylindrical studs 262 and 263 at its upper and lower ends which journal respectively in said apertures. The stud 263 at the lower end of shaft 261 is of sufficient length to accommodate a split clamp operating arm 264 which is adjustably clamped to said stud and is connected by a coiled contractile spring 265 to a bracket 266 secured at about the same level to the front face of front hopper wall 226.

Provided with a square bore 270 which slidably receives the square shaft 261 is a weight 271 having secured to the lower end thereof an arcuate pressure arm 272 which lies in a horizontal plane and is adapted to be swung inwardly into hopper 163 through opening 227 or outwardly from said hopper through said opening by the rotation of shaft 261. The action of spring 265 tends to constantly urge this shaft 261 to rotate so as to swing arm 272 inwardly through opening 227 into the position in which this is shown in FIG. 15. The purpose of this will be made clear hereinafter.

Mounted on the exterior of right wall 230 of hopper 163 is a solenoid 273 having a horizontally shiftable armature 274. Fixed on the extending end of armature 274 is a collar 275 having a punch arm 276 mounted therein, this arm extending horizontally towards the hopper 163 and being bent towards said hopper at a right angle with a sharp point 277 poised as shown in full lines in FIG. 15 for effecting a short jabbing action as indicated by broken lines in this view whenever the solenoid 273 is energized. The mounting of the solenoid 273 on hopper 163 provides a stationary arm 278 which guides and guards the arm 276 in this operation. The mounting of solenoid 273 also provides a wire spring 279 which extends downwardly and then upwardly through a hole 280 in the arm 276, this spring yieldably holding the arm 276 in its outward full line position shown in FIG. 15 whenever the solenoid 273 is de-energized. The purpose of the solenoid 273 will be made clear hereinafter.

Milled from inner faces of the rear and front walls 225 and 226 of hopper 163 just below the lower end of opening 227 in the front wall are horizontal slots 285 (FIGS. 6 and 16) in which are mounted a pair of horizontal card edge guides 286 which have narrow horizontal card edge guide channels 287 which face each other across the lower end of the hopper 163 in the horizontal plane in which cards 23 are delivered to hopper 163, as will be made clear hereinafter.

Fitting between lower portions of rear and front walls 225 and 226 of hopper 163 and secured to these walls by cap screws 288 is an elevator plunger bearing 289 slidably receiving an elevator plunger 290 therein. The lower end of this plunger is bifurated and pivotally connected by a pin 291 to a connecting rod 292 which is adjustable in length and pivotally connects at its lower end to the free extremity of cam following arm 89. The upper end of plunger 290 is shaped to provide a flange 293 and a threaded stud 294 which screws into a central tapped hole provided in an elevator platform 295. As may be noted by a comparison of FIGS. 4 and 5, the rotation of cam 87 with the shaft 49 operates to reciprocate the plunger 290 and the elevator platform 295 vertically between the full line positions in which these elements are shown in FIG. 5 and their full line positions in FIG. 4. This mechanism therefore constitutes an elevator 296.

The plan outline of the platform 295 as shown in FIG. 16 is such that it fits against and is guided by the spring dog devices 244, 245 and the filler bars 231 and 232 directly above these devices, during vertical movement of the platform. The shape of the platform 295 is also cut away so that this platform by-passes the bag closure retaining guide 234 and the dogs 256 in the reciprocatory movement aforesaid of said platform. The uppermost surface 300 of the platform 295 is horizontal and flat and extends from the extreme right edge of the platform to an arc 301 along which all that part of the platform 295 extending to the left of said arc is cut away to form a surface 302 which is horizontal and about 1/8 of an inch below the surface 300.

Picking mechanisms 303 and 304 will now be described for feeding bag closures 19 from hopper 161 and label cards from hopper 162 to the hopper 163 for assembling these elements in manufactured units 24 and stacking these in hopper 163. The closure picking mechanism 303 includes a bed plate 305 having a longitudinal slot 306 formed therein, this plate fitting between the main frame plates 27 and 28 of the machine 25 and being disposed beneath the hopper 161 and the glue applicator 102. Secured to the plate 305 by cap screws 307 are closure pick gibs 308, these having beveled ground faces 309 forming a guideway for a pick carriage 310 to travel in.

The pick carriage 310 has a drive bracket 315 secured to the bottom surface thereof by cap screws 316 and 317. Bracket 315 pivotally connects with one end of an extensibly adjustable link, the other end of which pivotally connects to the upper extremity of arm 85.

The carriage 310 has a flat horizontal deck 319 which, at the left end of the carriage is cut away to form a recess 320 for receiving a flat primary closure pick 321. This pick is secured to carriage 310 by cap screw 316 and by a short cap screw 322 which is countersunk upwardly into the carriage 310. The closure pick 321 is slightly thicker than the depth of the recess 320 so that a sharp right corner edge 323 of pick 321 extends above the deck 319 of the carriage 310 a distance slightly less than the thickness of one of the bag closures 19.

At its front end the pick carriage 310 is provided with a slot 324 which extends vertically through the carriage and the latter is provided with two horizontal pins 330 and 331 which extend through said slot. A secondary closure pick or pusher 332 is pivotally mounted on pin 330, this pick having a lower arm 333 which is normally urged into contact with pin 331 by a light coil spring 334 which is confined in a hole 335 drilled horizontally from the slot 324 into the pick carriage 310. When thus normally positioned, the secondary pick 332 extends upwardly at a slight angle toward the right as shown in FIG. 8.

Mounted on top of gibs 308 by cap screws 336 are bag closure guide tracks 337 which are recessed at their upper inner edges to provide shoulders 338 which extend under opposite side edges of a bag closure 19 being fed from bag closure hopper 161 towards unit hopper 163. Overlying guide tracks 337 and secured thereto by cap screws 339 are guide track caps 340, inner edges of which overlie the shoulders 338 provided on guide tracks 337 thereby forming parallel grooves receiving opposite sides of the bag closure 19 being fed as aforesaid.

It is now to be noted that the rocking of shaft 41 in the normal operation of machine 25, produces a continual reciprocation horizontally of the pick carriage 310 between its starting position in which it is shown in FIGS. 4, 8 and 9 and its opposite position in which it is shown in FIGS. 5 and 6. When the pick carriage moves from its retracted to its advanced position in each such reciprocation, the sharp right upper corner 323 of primary pick 321 picks a bag closure 19 from the bottom of closure hopper 161 and delivers this particular closure to an intermediate or gluing position as illustrated in FIG. 6. The position to which this particular closure 19 has thus been fed by primary pick 321 will be referred to hereinafter as the intermediate feed position of this bag closure. As shown in FIG. 6, bag closure 19 arrives in intermediate position just as the glue applicator 125 rotates in the direction of arrow 345 in FIG. 6 in order to cause the nose 138 of arm 137 to swipe the right hand end portion of the bag closure 19 in this position. As the tip 142 of insert 141 of said arm which contains the glue discharge orifices 149, is held out of contact with this closure 19, glue is free to flow from these orifices during the swiping of the bag closure 19 by the arm 137 so as to deliver a coating of glue onto this closure.

It is necessary to guard against the bag closure 19 in intermediate position being driven in a reverse direction along the guide tracks 337 as the closure pick carriage 310 returns towards its starting position, and this precaution is accomplished in the following manner. Two closure check springs 346 and 347 are secured by the left pair of cap screws 339 to the guide track caps 340 and recesses 348 are formed in inner edges of guide track caps 340 to receive a pair of fingers 349 from closure check spring 346 and a pair of fingers 350 from closure check spring 347. The check spring 346 is below the check spring 347 and the fingers 349 are thus below the fingers 350. The fingers 349 are shorter than the fingers 350 and are so positioned that they drop in behind the curved left corners of the bag closure 19 when it reaches intermediate position as shown in FIG. 6. The fingers 350 at this time being longer, the fingers 349 still overlie edge portions of this bag closure 19 in its intermediate position and hold said closure down so that the fingers 349 positively engage the left edge of this closure and prevent its reverse movement in the guide tracks 337. The closure check springs 346 and 347 remain in this relation with the bag closure 19 with the latter still in intermediate position throughout the return movement of the pick carriage 310 completing a single reciprocation thereof which brings it back to its starting position.

In this return movement of pick carriage 310 to its starting position, the secondary pick 332 mounted thereon is drawn leftward underneath the bag closure 19 held as above noted in its intermediate position by the check springs 346 and 347 so engagement of the secondary pick 332 with the closure depresses this pick by compressing the light spring 334 and permitting pick 332 to idle underneath the closure in intermediate position and then return to its upwardly inclined position at the conclusion of the reciprocation of pick carriage 310, as shown in FIG. 8.

At the beginning of the immediately following cycle of reciprocation of the pick carriage 310 therefore, it is clear that the secondary pick 332 is positioned just behind the bag closure 19 which is still in its intermediate position and which has been subjected to a gluing swipe by the glue applicator 125, so that at the start of the next rightward feeding movement of the carriage 310, secondary pick 332 engages this bag closure 19 in intermediate position and advances the latter from intermediate position to its terminal position shown in FIG. 6 where it comes to rest on the lower surface 302 of the left portion of the elevator platform 295.

The intermediate position, just vacated by a bag closure 19 being removed from that position by the secondary pick 332, is immediately filled by a new bag closure 19 which is delivered from the bottom of the closure hopper 161 by the primary pick 321.

Further details as to operation of the feed mechanism 303 will be deferred until a general discussion of the operation of machine 25.

The structure of label card feed mechanism 304 will now be described with particular reference to FIGS. 4, 5, 6a, 11, 12, 13 and 14. This mechanism has a bed plate 351 which is identical with bed plate 305 of mechanism 303 and is rigidly secured to major frame plates 27 and 28 by cap screws 352. Carriage gibs 353 are secured on top of bed plate 351 by cap screws 354, these gibs having beveled faces 355 to form a guideway for a label card pick carriage 356.

Plate 351 has a longitudinal slot 360 therein for accommodating a bracket 361 which is secured to the bottom of carriage 356 by cap screws 362. Pivotally connected at its opposite ends to the bracket 361 and to the upper end of pick operating arm 86 is a link 363 which is adjustable in length. Thus the carriage 356 is reciprocated by the rotation of shaft 40 of the machine 25 between the extreme rightward position in which carriage 356 is shown in FIG. 4 and the extreme leftward position in which this is shown in FIGS. 5 and 6a. As shown in the longitudinal sectional view of FIGS. 6–6a, the pick carriage 356 has a hole 364 forming a vacuum conduit. This hole is closed at its left end by a plug 365, and connects with transverse holes 366 and 367. Opposite ends of holes 366 and 367 open in ground beveled faces 368 which make a ground sealing engagement with beveled faces 355 of gibs 353, the significance of this being made clear hereinafter. It is also to be noted that the beveled face 355 of one of the gibs 353 is crossed at a certain point longitudinally therein by a vacuum relief channel 369.

Formed vertically in the label card pick carriage 356 to communicate with the hole 366 are three vacuum ports 375.

The vacuum ports 375 open upwardly through a flat horizontal deck 376 provided on the pick carriage 356 and another set of vacuum ports 377 open upwardly through said deck from vacuum hole 367. A recess 378 is milled away from the upper portion of carriage 356 at the right end of deck 376 to receive a primary card pick 379 which is secured to said carriage by one of the screws 362 and by a short screw 380. The pick 379 is slightly thicker than the depth of the recess 378 and presents a sharp picking shoulder 381 at the end thereof adjacent the deck 376 which extends above said deck a distance just slightly less than the thickness of one of the label cards 23. It is here to be noted that the deck 376 and pick 379 of pick carriage 356 are of approximately the same width as card gate 212 of hopper 162 (FIG. 11).

The right hand end of vacuum passage 364 is tapped to receive a nipple 382 which connects with a vacuum tube 383 leading from the vacuum pump 64.

Secured to upper faces of pick carriage gibs 353 by cap screws 384 are card check cam mounts 389 having card check cams 390 secured to their inner faces by screws 391. The card check cams 390 have their lower faces shaped to provide card edge depressing faces 392, card check shoulders 393, card check recesses 394, and card delivery guide faces 395, all of which may be seen in broken lines in FIG. 6a. The purpose of these various surfaces provided on card check cams 390 will be made clear hereinafter.

The machine 25 is started and stopped by controlling the circuit of the electric motor 59 through a switch secured to frame plate 30. Whenever this motor is energized, the rotary limit switch 94 is also energized through a cable 397.

The details of construction of the rotary limit switch 94 are not shown as this is a standard reduction gear actuated switch which is placed in the circuit of solenoid 273 to momentarily energize the latter upon the completion of each successive fifty cycles of operation of the machine 25.

Operation

In preparing machine 25 for operation, it is of course necessary that this be kept lubricated and the internal passages in the gluing mechanism must be kept clean so that the glue will flow through these and be emitted in the desired amounts from the tip of the arm 137 each time this arm swipes one of the bag closures 19 as shown in FIG. 6. The closure gate 165 of the closure hopper 161 must also be properly adjusted vertically so that the closure feed opening 182 between this gate and the deck 319 on the pick carriage 310 will be slightly greater than the thickness of one closure 19 but substantially less than the thickness of two such closures (FIG. 8). This adjustment may be readily effected in the machine 25 when the latter is in starting position by loosening the cap screws 179 thereby permitting the gate 175 to drop downwardly into contact with deck 319, then adjusting the arm 187 on which the micrometer 185 is mounted so that the contact element 184 of this micrometer just touches arm 183 on gate supporting bar 177 and with the micrometer 185 giving a zero reading. The bar 177 is then lifted to show an opening 182 of the desired thickness as measured by the reading of the micrometer 185 whereupon the cap screws 179 are reset to maintain the opening 182 as measured by the micrometer 185.

In a similar manner the opening shown in FIG. 11 between the lower end of card gate 212 and deck 376 through which cards are to be fed from the lower end of hopper 162 is adjusted by relaxing the cap screws 213 and 214 which normally retain gate 212 in a fixed vertical position on the hopper 162, and allowing this gate to descend into contact with the pick carriage deck 376. The arm 219 on which micrometer 218 is mounted is now adjusted to bring the sensitive element of this micrometer into contact with arm 217 provided on gate 212 and with this micrometer giving a reading of zero. The gate 212 is now raised until the micrometer 218 gives a reading of the desired opening between the lower end of gate 212 and deck 376 whereupon the cap screws 213 and 214 are reset to secure the gate 212 in its adjusted position.

It is to be noted that when the parts of machine 25 are in starting position as shown in FIG. 4, the deck 376 of pick carriage 356 is disposed directly beneath the card hopper 162 so that a column of cards 23 placed in this hopper rest directly on this deck. The vacuum ports 375 are at this time located just inwardly from the left edge of the lowermost card in hopper 162 while the ports 377 are located just inwardly from the right edge of said card. It is also to be noted that at this time the opposite ends of transverse holes 366 and 367 formed in card pick carriage 356 are closed by their sealing engagement with the ground beveled faces 355 of gibs 353 (FIG. 12). When the machine 25 is started by energizing the motor 59 the vacuum pump 64 is effective to almost immediately impose a vacuum on the vacuum passages in pick carriage 356 which makes this vacuum effective through vertical ports 375 and 377 in holding the lowermost card 23 in card hopper 162 snugly against the deck 376 of this carriage. The central portion of this card which bears against deck 376 is thus held downwardly in horizontal alignment with shoulder 381 on pick 379 so that the first movement of carriage 356 from its starting position will cause this pick to feed the lowermost card 23 in a leftward direction through the feed opening between gate 212 and deck 376.

As shown in FIG. 11, substantial edge portions of the card 23 thus fed from the bottom of hopper 162 extend laterally from over the deck 376 of carriage 356. These edge portions of this card 23 engage cam faces 392 of card check cams 390 as shown in FIG. 6a so that these card edges are deflected downwardly to bypass check shoulders 393 at the lower ends of said cam faces and allow these edge portions of card 23 to spring upwardly at the end of this feeding movement of this card to come to rest in recesses 394 provided in the card checks 390 (FIG. 12). Recesses 394 are formed upwardly in advance of shoulders 393 so that when the card edges are confined in recesses 394 they are prevented by engagement with the shoulders 393 from returning with the pick carriage 356 on the return movement of its feeding reciprocation.

The position into which this card 23 is thus fed by the leftward movement of pick carriage 356, as just above described, will be referred to as the intermediate position of this card. The feeding of this card from the bottom of hopper 162 is effected by the pick 397 but is aided by the vacuum which holds the middle portion of this card downwardly against the deck 376. For illustrative purposes FIG. 12 shows the middle portion of this card 23 held snugly against deck 376 while the edge portions of the cards are deflected downwardly by the card check cams 390. This action of the vacuum in holding the middle portion of card 23 downwardly against deck 376 terminates upon the arrival of the pick carriage 356 in its leftwardmost position as shown in FIG. 6a. Here the transverse vacuum hole 366 comes into communication with the vacuum release port 369 formed in the beveled face 355 of one of the gibs 353 (FIG. 13). The latter view illustrates the relaxation of the hold of said vacuum in the middle portion of card 23 in its intermediate feeding position resulting from the breaking of the vacuum in the ports 375 and 377.

In preparing the machine 25 for operation, the hopper 161 is filled with bag closures 19 and the hopper 162 is filled with label cards 23. This service must be kept up from time to time throughout the operation of the machine so that neither of these hoppers run out of these elements required in the operation of the machine.

The bottle 151 must also be filled with liquid glue of a suitable type which will flow through the glue passage of the machine 25 and this bottle is kept adjusted at the required level for giving a proper gravity feed of the glue to the applicator 102, by shifting the arm 153 on the end plate 29 of machine 25.

With the machine 25 thus prepared for operation, it is started by closing switch 396 to energize motor 59 and the rest of the electrical apparatus. The direct drive shaft 60 of motor 59 thus actuates the vacuum pump 64 to set up a vacuum in the pick carriage 356. Through belt 71, motor 59 rotates shaft 40 which functions, as above noted, in producing a constant series of opposite reciprocations of the closure pick carriage 310 and the card pick carriage 356 from their starting positions shown in FIG. 4 through their inward positions shown in FIG. 5, and returning to their starting positions to complete a cycle of operation.

Each such cycle starts with the elevator platform 295 in its upward position as shown in FIG. 4. While pick carriages 310 and 356 are moving towards each other to their inwardmost positions, cam 87 is lowering elevator platform 295 to its lowermost position shown in FIG. 5. Then, as said pick carriages return to their outwardmost positions shown in FIG. 4, the elevator returns to its upwardmost position shown in this view.

The glue applicator 125 is of course rotated in 1 to 1 relationship with shaft 40 so that arm 137 is disposed upwardly as shown in FIG. 4 at the start of each cycle of operation and downwardly as shown in FIG. 5 at the midpoint in each such cycle. The cycle being described is one in a sequence of such cycles so that in the immediately preceding cycle, a bag closure 19 was left in its intermediate position beneath the glue applicator 125 as shown in FIG. 6 and a label card 23 was left, in said immediately preceding cycle, in its intermediate position as shown in FIG. 6a.

As previously noted, the closure pick carriage 310 feeds a closure 19, in intermediate position, and to which glue has been applied, along channels provided by closure guides 347 and plates 340 and discharges this closure from the end of these channels onto the lower level surface 302 on the elevator 295 (FIG. 6). Concurrently with this action, the closure pick 321 feeds the lowermost closure 19 in closure hopper 161 beneath hopper gate 175 and beneath the closure check springs 346 and 349 and into the intermediate position for this closure shown in FIG. 6 where it receives a coating of glue from the glue applicator 125.

In the second half of the cycle of operation being described the closure pick carriage 310 merely idles leftward from the position in which this is shown in FIG. 6 to the position in which it is shown in FIG. 8. Leftward movement of the lowermost bag closure 19 in hopper 161 due to its frictional engagement with the pick 321 and deck 319 during return of the carriage 310 to starting position, is prevented by the check plates 196 which extend downwardly below the level of the lowermost closure 19 in hopper 161 and are engaged by edge portions of this closure as shown in FIG. 6a during the second half of each cycle of operation to prevent the leftward shifting of the lowermost closure 19 out of the hopper 161.

In the second half of the cycle being described, the label card pick carriage returns from the position in which it is shown in FIG. 5 to the position it is shown in in FIG. 4, thus leaving the card 23 picked from hopper 162 in the first half of this cycle, retained in its intermediate position by engagement with the shoulders 393 on the card check cams 390, as shown in FIG. 6a. In the first half of this cycle of operation, however, a card was left by the last previous cycle of operation in intermediate position and this card was engaged by the left end of deck 376 of card pick carriage 356 and pushed leftward beneath the guide surfaces 395 on the card check cams 390 and out of the channels formed by gibs 353, check mounts 389 and card checks 390, into the channels 287 formed in card guides 286 located in the lower end of assembled unit hopper 163 (FIG. 6). In this position card 23 is supported by card guides 286 directly above but out of contact with the upper level surface 300 of elevator platform 295.

In the second half of the cycle being described, the card pick carriage 356 returns to its rightward starting position shown in FIG. 4 without the friction between pick 379 and pick 376 and the lowermost card 23 and hopper 162 causing a rightward movement of this card from said hopper because the panels 203 in opposite right corner portions of said hopper extend downwardly below the lowermost card (FIG. 6a) so as to prevent rightward shifting of the lower card by the reverse movement of the pick carriage 356. This reverse movement of the card pick carriage 356 terminates with the pick 379 repositioned for a card feeding movement at the beginning of the next following cycle of operation, and with the left end of deck 376 withdrawn to the right beyond the right hand edge of the card 23 just previously fed to intermediate position.

Assuming that the cycle being described is one in a series which was preceded by at least one operating cycle, it is to be noted that at the start of the cycle being described the elevator platform 295 is in its upwardmost position as shown in FIG. 4 and is there supporting one or more units 24 each of which comprises a bag closure 19 glued to a label card 23. In this uppermost position, elevator platform 295 supports these units above and out of contact with the dogs 255 so that the heads 256 of the latter are spring shifted into their innermost positions in the lower end of the hopper 163. Dogs 255 are clearly shown thus positioned in FIG. 16, although no units 24 are shown in this view. Such a unit however is outlined in broken lines 400 to illustrate how dogs 255 extend outwardly into supporting relation with any units disposed above elevator platform 295 and assume the support of these units when the elevator, at the start of each cycle of operation, moves downwardly past the dog heads 256 with the latter extended outwardly as shown in FIG. 16.

It is also to be borne in mind that arm 272 carrying the downward pressure of weight 271, is resting directly downwardly on such units supported by elevator 295 at the start of the cycle of operation over an area of the closures of such units which is subsequently supported from beneath by the dog heads 256. This can be seen by a comparison of FIGS. 15 and 16. Thus, when the elevator starts downwardly at the start of a cycle of operation leaving the one or more units 24 previously supported by the elevator, resting on the dog heads 256, these units are compressed between these dog heads and the weight arm 272 so as to force the closure and card elements of each such unit together in the area where glue has been applied to the closure of said unit. This compression of the two elements of each unit together facilitates the adhesion of said elements together as the glue dries.

As previously noted, the closure retaining guide 234 which is fixed in the lower end of unit hopper 163 is positioned so that the bead 242 of this guide will be received by the openings 20 of the closures 19 of all the units 24 elevated into this hopper and such closures will thus be guided by this bead and held in proper assembled relation with the cards of these units as the latter are stacked during successive cycles of operation of the machine 25.

The rotary limit switch 94 may be selected and with a reduction gear ratio to cause the momentary energizing of solenoid 273 at any desired multiple of operating cycles so as to determine the number of units 24 produced and stacked upwardly in hopper 163 between successive actuations of this solenoid. A convenient multiple between successive actuations of the solenoid 273 is fifty operations so that there will always be fifty units 24 in the stack formed in the hopper 163 between each adjacent pair of the marks applied by said solenoid. This makes it very easy for the operator to remove the units 24 from hopper 163 for packaging and shipment in quantities precisely measured by said marks and eliminates the necessity for individually counting or otherwise measuring the number of units 24 taken from machine 25.

The claims are:

1. In a machine for gluing together an element A of sheet material and an element B of sheet material to produce an assembled unit, the combination of: a hopper for holding a stack of elements A; a hopper for holding a stack of elements B; means for simultaneously feeding a pair of elements A and B from said hoppers into a fixed overlapping relation; means for applying glue to one of said elements to lie between said elements when thus related; means to press said elements together as so related to glue said elements together as an assembled unit; hopper for holding a stack of said units; means for delivering said pairs of elements related as aforesaid to said unit hopper to form, from one direction, a stack of units therein; and means for applying pressure in the opposite direction to said stack, as it is being formed in said hopper to compress the elements in each unit together to cause said elements in each unit to be glued together as said glue dries.

2. In a machine for gluing together an element A of sheet material and an element B of sheet material to produce an assembled unit, the combination of: three parallel upright hoppers, one for elements A, one for elements B and one for said units, said hoppers having parallel walls for respectively closely confining stacks of said elements and units; means for coincidentally feeding a pair of elements from said respective elements hoppers into parallel overlapping relation with each other in planes normal to the axis of said unit hopper and with said elements so fed embraced within the projected space confined by the walls of said unit hopper; means for applying glue to a surface area on one of said elements so fed which area faces and is overlapped by the other of said elements so fed; means shifting said pair of elements along the axis of said unit hopper into said hopper; retaining means acting on said pair of elements to limit movement of said unit in a reverse direction in said unit hopper; and means for applying pressure reversely against said pair of elements to press the glue coated area of one of said elements against the other element to glue said pair of elements together, said pressure being yieldably maintained on said unit and units subsequently delivered into said unit hopper as a stack of units is formed in said unit hopper by a repetition of the cycle of operations aforesaid.

3. A combination as in claim 1 in which said glue applying means applies glue to one of said elements while said element is on the way from the hopper from which it is removed, to the place where said element comes into overlapping relation with the other element of the pair.

4. A combination as in claim 3 in which the means for feeding said elements from their respective hoppers to said unit hopper accomplishes this feeding in two steps separated by a pause, said glue applying means applying glue to one of the elements of each pair during said pause in the feeding of these to said unit hopper.

5. A combination as in claim 4 in which said glue applying means comprises a rotary arm having means for emitting glue from the extremity of said arm and means for rotating said arm in timed relation with the feeding of said elements, said arm being tangentially related to the element to which glue is to be applied during each such pause, whereby said arm swipes a certain area of said element and applies a coating of glue to said area.

6. In a machine for gluing together an element A of sheet material and an element B of sheet material to produce an assembled unit, the combination of: three parallel upright hoppers, one for elements A, one for elements B and one for said units, said hoppers having parallel walls for respectively closely confining stacks of said elements and units; a two-stage element A pick means having a starting position beneath said element A hopper; a two-stage element B pick means having a starting position beneath said element B hopper; unit elevator means located beneath said unit hopper and having an elevated starting position; rotary glue applying means having an inoperative starting position; power means for reciprocating said two pick means simultaneously toward and away from said unit hopper in each operating cycle to deliver elements A and B from their respective hoppers halfway to said unit hopper, and to deliver elements previously advanced to said halfway positions, the balance of the way to said unit hopper and with said elements overlapping each other and in vertical alignment with said unit hopper, said power means also operating said rotary glue applying means to apply glue to an area on one of said elements in its halfway position, which area will be overlapped by the corresponding other element of a unit when both said elements are subsequently delivered under said unit hopper, said power means also operating said elevator to elevate up into said unit hopper each pair of elements so delivered beneath said hopper in the interval between said delivery and the next following delivery of a pair of said elements under said unit hopper; and means which vertically by-pass each new pair of elements added to said unit hopper to support the stacked units previously elevated into said unit hopper to prevent interference of said stack with new pairs of elements delivered beneath said unit hopper.

7. A combination as in claim 6 in which said unit stack support means operates at a fixed level in said unit hopper just below the upper limit of travel of said elevator where each unit added to the unit stack is lifted above and by-passes said means, allowing the latter to automatically assume the support of said stack, with said added unit, when said elevator returns downward.

8. In a machine for gluing together elements A and B of sheet material to produce an assembled unit, the combination of: an upright unit hopper with parallel walls; a vertically reciprocable elevator at the lower end of said hopper with space thereabove when said elevator is lowered, for feeding said elements horizontally inward over said elevator with said elements in overlapping relation with glue applied to one of said elements between overlapping portions of said elements, whereby the lifting of said elevator will raise said elements up a short distance into said hopper; and dog means yieldably extending into the path of upward travel of said elevator so as to be engaged by at least one of the elements so raised and shifted outwardly allowing said elements to by-pass said dog means whereby the latter returns into said hopper beneath said raised pair of elements, to support the same in said hopper when said elevator returns downward to its lowered position.

9. A combination as in claim 8 in which yieldable means is provided in said hopper for pressing downward on said pair of elements so elevated and supported in said hopper to press said elements together in the overlapping area thereof causing the glue in said area to unite said elements.

10. A combination as in claim 9 in which said yieldable down-pressing means comprises a weight.

11. A combination as in claim 9 in which said unit hopper has a vertical opening in one of its walls coextensive with its length and in which said yieldable down-pressing means includes an arm adapted to extend through said opening; and means for mounting said arm for vertical movement outside said hopper, said means yieldably moving said arm inwardly through said wall opening into said hopper, when said arm is released from restraint above a stack of units which has been formed in said hopper, whereby said arm then gravitates downwardly into pressural relation with the units comprising said stack.

12. A combination as in claim 11 in which said arm is arcuately shaped and said arm mounting means includes a bearing hub to which said arm is secured, said hub having a square bore; a square shaft slidably fitting said bore; means rotatably mounting said shaft close to and parallel with said hopper; and means yieldably rotating said shaft to swing said arm through said hopper wall opening into said hopper.

13. A combination as in claim 8 in which the lower one of said elements in each such pair is provided with an opening from one end thereof with a restricted mouth, said opening being located outside the area in which said elements overlap; and a stationary vertical guide extending into a lower portion of said hopper, said guide having a cross section including a thin web terminating in a thick bead, which web is readily received in the mouth of said element opening, and said bead is received in the opening itself, as said pair of elements are raised into said hopper, whereby said guide cooperates with said dog means to support the lower element of said pair and properly align it with the upper element so that said upper element is supported on said lower element when said elevator returns to its lowered position.

14. A combination as in claim 13 in which yieldable means is provided in said hopper for pressing downwardly against the uppermost of a pair or series of pairs of elements thus elevated into said hopper, to press together the elements of each pair whereby these are respectively united by the glue therebetween.

15. In combination: a hopper with parallel walls, for receiving a series of units formed of sheet material in stacked relation as said units are manufactured; manufacturing means for assembling and delivering said units into one end of said hopper; means for retaining said units in said hopper and compressing the same longitudinally of said stack; means for marking one of said units in said stack at intervals in the formation of said stack and at a particular location in said hopper; and means controlled by said manufacturing means to actuate said marking means at uniform intervals, during each of which a fixed number of said units have been delivered to said hopper, whereby said stack is divided by the marks so applied into sections, each of which contains said fixed number of units.

16. A combination as in claim 15 in which said marking means includes a solenoid having a shiftable armature; a marking tool mounted on said armature, said tool being poised to be brought into marking engagement with a unit at a certain location in said hopper when said solenoid is energized; a rotary limit switch connected in the circuit of said solenoid; and reduction gear means driven by said manufacturing means to momentarily close said switch and then immediately open the same at intervals separated by the delivery to said hopper of said fixed number of units.

17. In combination: parallel grooved guide means for receiving and guiding parallel side edge portions of an element of sheet material; reciprocating means for feeding said element along said guide means to a given position; spring fingers which overlie said side edge portions as said element approaches said position and which drop down behind said element as it arrives at said position; a second pair of spring fingers which overlie said side edge portions and are in advance of said first pair of fingers so as to remain in downwardly pressing relation with said element when the latter reaches said position thereby rendering said first pair of fingers effective as back-checks preventing reverse movement of said element when said reciprocating feed means returns to starting position; a rotary glue applying arm mounted above said position; and means for rotating said arm in timed relation with the operation of said reciprocating feeding means to wipe a given area of said element and apply glue thereto as said feeding means returns to its starting position, said wiping by said arm being towards said back-check springs; and a yieldable feed dog on said feeding means which idles past said element on the return stroke of said feeding means and, on the next feeding movement of said feeding means, engages said glued element and advances it a distance approximately equal to that traveled by said element in reaching its position aforesaid.

References Cited in the file of this patent

UNITED STATES PATENTS

| | | |
|---|---|---|
| 1,828,013 | Yingling | Oct. 20, 1931 |
| 2,075,795 | Babcock | Apr. 6, 1937 |
| 2,482,133 | Sweetser | Sept. 20, 1949 |
| 2,812,939 | Harred | Nov. 12, 1957 |
| 2,876,007 | Patrick | Mar. 3, 1959 |